Patented Dec. 9, 1941

2,265,207

UNITED STATES PATENT OFFICE 2,265,207

D-LYSERGIC ACID - D - L-HYDROXYBUTYL-AMIDE-2 AND A PROCESS FOR ITS PREPARATION

Arthur Stoll and Albert Hofmann, Basel, Switzerland, assignors to Sandoz A. G., Basel, Switzerland No Drawing. Application May 24, 1940, Serial No. 337,109. In Switzerland June 6, 1939

3 Claims. (Cl. 260—236)

The present invention relates to the manufacture of a new amide of lysergic acid which possesses valuable pharmacological properties.

In our U. S. Patent No. 2,090,430 we have described a process for the preparation of lysergic acid amides which consists in condensing lysergic acid azide with a primary or secondary amine.

We have now found that by condensing iso-lysergic acid azide with d-2-aminobutanol-1 and subjecting the product thus obtained to a transposition treatment, d-lysergic acid-d-l-hydroxybutylamide-2 will be obtained, which possesses much better physiological properties than the most uteroactive alkaloid from ergot (Ergobasine, Ergonovine) known until now.

The following example shows how the synthesis of such alkaloidal body can be carried out, the parts being by weight.

Example

To a freshly prepared solution of 2 parts of d-iso-lysergic acid azide in 300 parts of ether is added an ethereal solution of 2 parts of d-2-aminobutanol-1 and the mixture is left to stand at room temperature during 12 hours. The yellowish clear solution is then washed several times with some water, dried over sodium sulphate and the ether evaporated in vacuo. The crystallized residue is treated with a small quantity of acetone and filtered. Yield: 2.2 parts of d-isolysergic acid-d-l-hydroxybutylamide-2.

On recrystallization from some hot methanol the new compound is obtained in form of beautiful polygonal crystals that melt with some decomposition at 192–194° C. (corr.). The optical rotation is $[\alpha]^{20}_D = +386°$ ($c=0.4$ in chloroform).

The analysis has given following values:

|  | C 70.84 | H 7.57 | N 12.77% |
|---|---|---|---|
| Calculated for $C_{20}H_{25}O_2N_3$ | C 70.75 | H 7.43 | N 12.39% |

The transposition of the isolysergic acid derivative into its respective compound of the lysergic acid series can be carried out by treating the above cited compound with acids, such as acetic acid, phosphoric acid, or alkalies, such as sodium and potassium hydroxide. This transposition can be carried out for instance in the following way:

One part of the iso-compound is dissolved in 10 parts of absolute ethanol and an alcoholic potassium hydroxide solution is added thereto. The mixture is left to stand at room temperature during 45 minutes. After this time equilibrium is reached between lysergic acid and the iso-lysergic acid forms, which can be checked by determination of the constancy of the optical rotation of the solution. When this point is reached, potassium hydroxide is transformed into potassium carbonate by bubbling through the solution a stream of carbon dioxide; the thick crystal paste of potassium carbonate is then diluted with 50 parts of ether, filtered and washed again with 50 parts of ether.

The alcoholic ethereal filtrate is then dried over calcined potassium carbonate and the solution evaporated, whereby 0.9–1 part of a mixture of d-lysergic acid-d-l-hydroxybutylamide-2 and of d-isolysergic acid-d-l-hydroxybutylamide-2 is obtained.

In order to separate the isomers, the residue is dissolved in 15 parts of hot chloroform and filtered from the small quantity of inorganic salt, whereby on cooling down, the difficultly soluble chloroform compound of d-lysergic acid-d-l-hydroxybutylamide-2 crystallizes out. Yield: 0.4 part.

This compound can be recrystallized from hot benzene, whereby flittering crystals melting with some decomposition at 172° C. (corr.) are obtained. This alkaloid gives the Keller's and van Urk's color reaction. The optical rotation is $[\alpha]^{20}_D = -45°$ ($c=0.4$ in pyridine). The new alkaloid is difficultly soluble in water, but easily soluble in ethanol and acetone. The analysis has given the following results:

|  | C 70.70 | H 7.73 | N 12.39% |
|---|---|---|---|
| Calculated for $C_{20}H_{25}O_2N_3$ | C 70.75 | H 7.43 | N 12.39% |

On pharmacological study it has been found that this compound is more active than the most utero-active natural ergot alkaloid known under the name of Ergonovine (Ergobasine).

This base gives easily water-soluble salts with inorganic and organic acids, such as hydrochloric, phosphoric, acetic, tartaric, oxalic acids. The neutral tartrate of the base can be prepared for example by treating a methanol solution of the base with the equivalent quantity of tartaric acid, whereby the neutral salt crystallizes out in white needles formed to bushes. This salt is easily soluble in water. When dried in high vacuo, its composition is $(C_{20}H_{25}O_2N_3)_2 \cdot C_4H_6O_6$. The analysis of the salt has given the following values:

| Found | C=63.81% | H=6.89% | N= 9.95% |
|---|---|---|---|
| Calculated | C=63.73% | H=6.81% | N=10.14% |

What we claim is:

1. The d-lysergic acid-d-1-hydroxybutyl-amide-2 of the formula $C_{20}H_{25}O_2N_3$, possessing the optical rotation $[\alpha]^{20}_D = -45°$ ($c = 0.4$ in pyridine), which is difficultly soluble in ethanol and acetone, which gives the Keller's and van Urk's color reaction and which possesses strong utero-active properties.

2. The salts of d-lysergic acid-d-1-hydroxybutylamide-2 with inorganic and organic acids, which are easily soluble in water and which give the Keller's and van Urk's reaction.

3. The tartrate of d-lysergic acid-d-1-hydroxybutylamide-2 of the formula $$(C_{20}H_{25}O_2N_3)_2 \cdot C_4H_6O_6$$

which is easily soluble in water, crystallizing from ethanol solution in form of white needles and which gives the Keller's and van Urk's color reaction.

ARTHUR STOLL.
ALBERT HOFMANN.